United States Patent
Bradfield et al.

[11] Patent Number: 5,254,896
[45] Date of Patent: Oct. 19, 1993

[54] ALTERNATING CURRENT GENERATOR ROTOR

[75] Inventors: Michael D. Bradfield; Jorge E. Silva; Thomas R. Sowash, all of Anderson, Ind.

[73] Assignee: General Motors Corporation, Detroit, Mich.

[21] Appl. No.: 979,675

[22] Filed: Nov. 20, 1992

[51] Int. Cl.$^5$ .............................................. H02K 1/22
[52] U.S. Cl. ..................................... 310/263; 310/45; 310/62; 310/71; 310/232
[58] Field of Search .................. 310/263, 62, 63, 232, 310/43, 45, 71, 90, 198, 194

[56] References Cited

U.S. PATENT DOCUMENTS

| | | | |
|---|---|---|---|
| 3,184,625 | 5/1965 | Farison | 310/263 UX |
| 3,230,404 | 1/1966 | Graham | 310/263 UX |
| 3,603,825 | 9/1971 | Sheridan | 310/194 |
| 3,629,630 | 12/1971 | Cotton | 310/68 |
| 4,114,056 | 9/1978 | Nimura | 310/194 |
| 4,286,186 | 8/1981 | Hagenlocher et al. | 310/89 |
| 4,419,597 | 12/1983 | Shiga et al. | 310/68 D |
| 4,565,936 | 1/1986 | Ikegami | 310/62 |
| 4,588,911 | 5/1986 | Gold | 310/194 |
| 4,588,915 | 5/1986 | Gold | 310/194 |
| 4,618,793 | 10/1986 | Shizuka | 310/232 |
| 4,686,399 | 8/1987 | Imori | 310/62 |
| 4,926,076 | 5/1990 | Nimura et al. | 310/68 D |
| 5,095,235 | 3/1992 | Kitamura | 310/62 |

Primary Examiner—R. Skudy
Attorney, Agent, or Firm—Creighton R. Meland

[57] ABSTRACT

A rotor for an alternating current generator of a type that has two pole segments provided with interleaved pole teeth and a core disposed between the segments that carries a field coil. The shaft of the rotor carries a slip ring assembly having two metallic slip rings. A ball bearing is disposed between one of the pole segments and the slip ring assembly. A portion of the shaft that is located inside of the inner race of the ball bearing has a pair of slots and wires for connecting the field coil to the slip rings are located in the slots and inside the inner race of the bearing. The electrical connections between the ends of the field coil and the slip rings includes wires that are twisted together to form twisted wire portions. The twisted wire portions are locked or fixed to a fan that is formed of thermoplastic material by material of the fan that completely encircles portions of the twisted wire portions.

5 Claims, 2 Drawing Sheets

ALTERNATING CURRENT GENERATOR ROTOR

This invention relates to a rotor for an alternating current generator and, more particularly, to a new and improved electrical connection between the field coil and slip rings of the rotor.

Rotors for alternating current generators of the claw-pole or Lundell type are well known to those skilled in the art, one example being the rotor disclosed in Gold, U.S. Pat. No. 4,588,911. In that patent, conductors connected to the slip rings are electrically connected to conductors connected to the field coil by crimping a metallic clip to the conductors and then welding the clip to the conductors.

When a rotor of the type that has been described is rotated at high speed for example, 21,000 RPM, the electrical connection between the field coil and slip rings must withstand high centrifugal and cyclic stresses. At speeds of 21,000 RPM, even relatively small masses can generate significant forces.

In accordance with this invention, conductors or wires that are connected respectively to the field coil and slip rings are twisted together and welded. The twisted and connected wires are then bent flat against a portion of a fan that is formed of thermoplastic material. The twisted wire pairs, when bent against the fan, lie in planes that are normal to the axis of the rotor shaft. Further, the thermoplastic fan is provided with pairs of integral bosses and the twisted wire pairs are bent into the space between the bosses. The bosses are then ultrasonically upset which causes the thermoplastic material of the bosses to melt and flow together in and across a twisted wire pair. The melted material forms a retaining bridge portion that connects the bosses and extends across the twisted wire pair. This mechanically bonds and locks the twisted wire pair in place.

In accordance with another aspect of this invention, a rotor is provided where the bearing for the slip ring end of the rotor is located between the slip rings and the rotor field coil. To make an electrical connection between the slip rings and the field coil, conductors that are connected to the slip rings extend through the interior of the bearing. This is accomplished by providing slots in the rotor shaft that extend through the bearing with the conductors that are connected to the slip rings being located in the slots.

IN THE DRAWINGS

Figure 1:
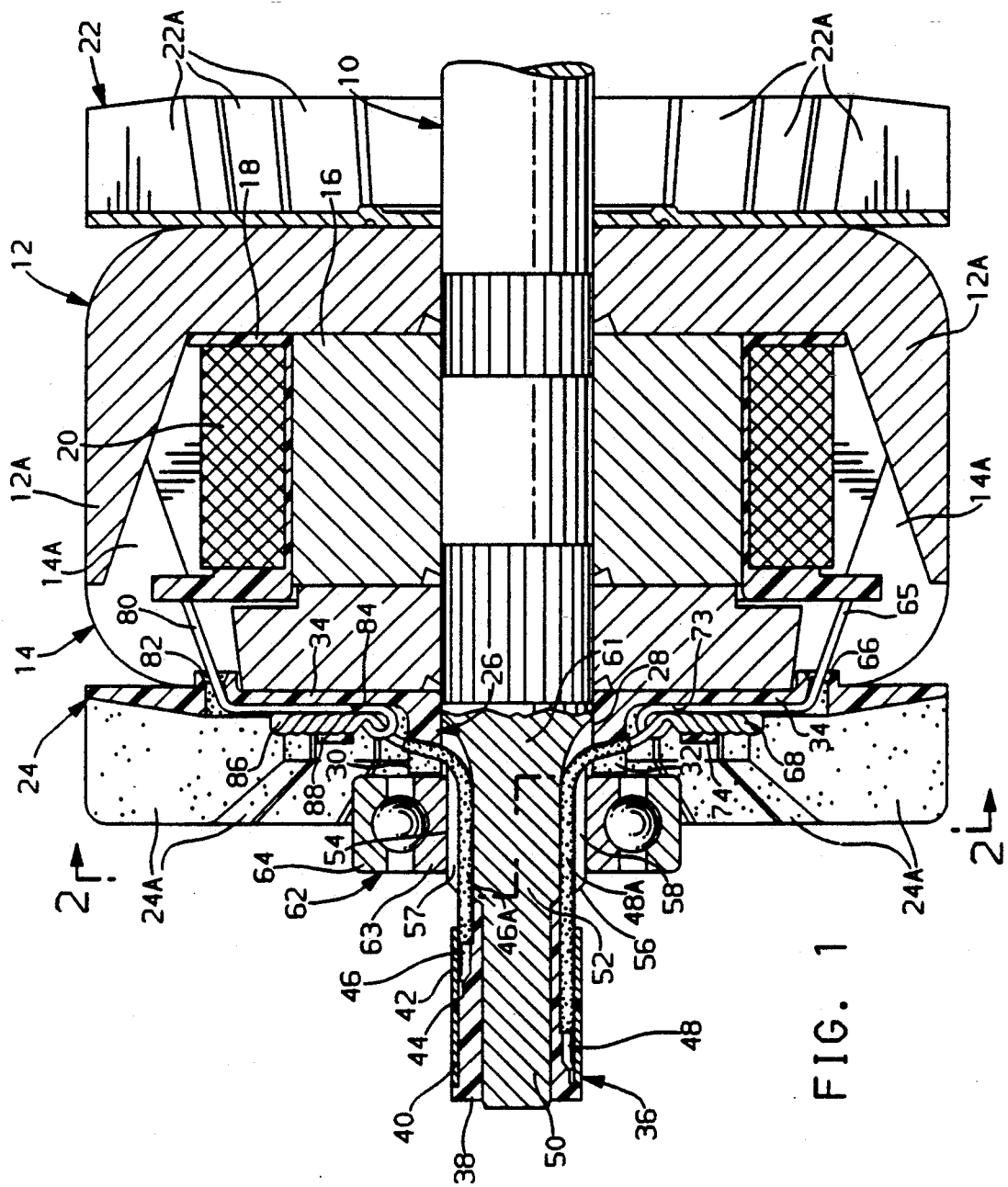
FIG. 1 is a sectional view of an alternating current generator rotor made in accordance with this invention.

Referring now to the drawings, and more particularly to FIG. 1, the rotor of this invention comprises a steel shaft generally designated as 10. The shaft 10 carries a pair of poles or segments 12 and 14 that are formed of a magnetic material such as steel. Segment 12 has a plurality of circumferentially spaced pole teeth 12A and segment 14 has an equal number of circumferentially spaced pole teeth 14A. The pole teeth of the two segments are interleaved, that is, the pole teeth of a segment are located in the gaps between the pole teeth of the other segment.

The rotor has a cylindrical core member 16 which is formed of a magnetic material such as steel. The end faces of core 16 respectively engage inner annular surfaces of pole segments 12 and 14.

The rotor has a field coil supporting spool 18 that is formed of a molded electrical insulating material. The spool 18 carries a field coil 20 which is comprised of a number of turns of insulated copper wire.

The rotor has an air impelling fan 22 that is formed of a metallic material, such as steel, that is welded to pole member 12. This fan 22 has fan blades 22A.

The rotor has another fan 24 provided with fan blades 24A that is formed of an electrical insulating material such as a glass filled nylon material which is a thermoplastic material. Fan 24 is a one-piece molded part and, as will be more fully described hereinafter, performs a conductor supporting function as well as an air impelling function.

The fan 24 has an annular hub 26, the inner bore surface of which engages a cylindrical outer surface 28 on shaft 10. The hub 26 has slots 30 and 32, the purpose of which is described hereinafter. Further, fan 24 has an annular wall portion 34, one inside surface of which engages pole segment 14.

The rotor has a slip ring assembly generally designated by reference numeral 36. This slip ring assembly comprises an insulator member 38 that is formed of a molded electrical insulating material. The insulator member 38 carries copper slip rings 40 and 42 that are separated by a washer 44 formed of electrical insulating material.

The slip ring 42 is electrically connected to one end of a copper wire or conductor 46. This is accomplished by welding one end of conductor 46 to an internal surface portion of slip ring 42. The slip ring 40 is electrically connected to one end of a copper wire or conductor 48. This is accomplished by welding one end of conductor 48 to an internal surface of slip ring 40.

The slip ring assembly 36 is disposed about a portion 50 of shaft 10. This portion 50 has an outer shape (not illustrated) defined by two opposed flat surfaces that have been machined into a cylindrical shaft thereby defining two opposed flat surfaces and two opposed arcuate or cylindrical surfaces. The internal bore surfaces of insulator 38 have a shape that complements the outer surface shape of shaft portion 50.

The shaft 10 has another portion 52 that has an outer cylindrical surface 54. Shaft portion 52 has a larger diameter than shaft portion 50 and the two shaft portions are joined by a conical surface 56.

The shaft portion 52 has two diametrically opposed slots 57 and 58. The ends of slots 57 and 58 near hub 26 have curved surfaces. The shaft portion designated as 61 has the previously described outer surface 28 which is cylindrical and which is interrupted by slots 57 and 58. The diameter of shaft portion 61 is slightly larger than the diameter of shaft portion 52.

The rotor has a ball bearing generally designated as 62. The inner race 63 of the ball bearing 62 engages the cylindrical surface 54 of shaft portion 52. Further, the right end of inner race 63 engages the end of hub 26 of fan 24. The outer race 64 of the ball bearing is adapted to be supported by an end frame of an alternating current generator (not illustrated) thereby rotatably support one end of the rotor. In such an arrangement, the slip ring assembly 36 is located outboard of the end frame that supports bearing 62. Further, in such an arrangement, a suitable cover is provided for covering the slip assembly which is attached to the end frame that supports the bearing.

A portion of the copper wire 48 is located in slot 58 and inside of the inner race 63 of the bearing. Conductor 48 has an outer insulator 48A formed of electrical insulating material. This insulator serves to insulate the copper wire from slip ring 42 and from shaft 10. The end of wire 48 that is opposite the end that is connected to the slip ring 40 is connected to a copper wire or conductor 65 in a manner to be described hereinafter. One end of wire 65 is electrically connected to one end or side of the field coil 20. Wire 65 extends through a hole 66 formed in fan 24. A short portion of wire 48 is located in slot 32 in the hub 26 of the fan 24.

The manner in which the ends of wires 48 and 65 are connected together will now be described. Prior to connecting the ends of wires 48 and 65 together, the ends of the wires are positioned next to each other and at an angle of about 65 degrees from wall 34 of fan 24. The wires are now twisted together over a length of about 12 mm. to form a twisted together wire portion. The twisted wires are then welded together, for example, at two places. The length of twisted wires or the twisted together wire portion that have just been described is designated as 68 and is shown in the drawings in its final position where the twisted wires have been moved from the 65 degree position to a position that is normal to the longitudinal axis of shaft 10.

Figure 3:
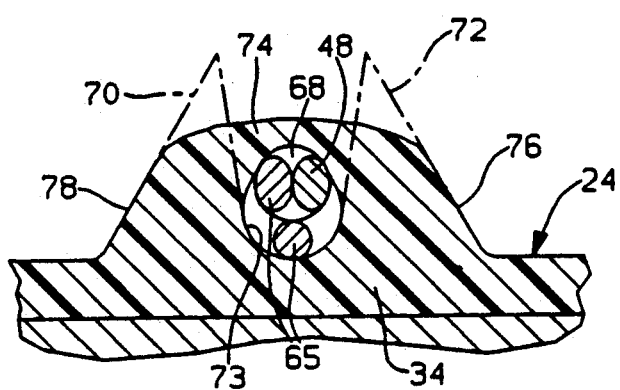
FIG. 3 is an enlarged sectional view taken along line 3—3 of FIG. 2.

When the twisted together wire portion 68 is moved from the 65 degree position to the position shown in the drawings, it is moved into a space between two projections or bosses on the fan 24 which will now be described. The two bosses are shown in the enlarged sectional view of FIG. 3. In FIG. 3, the phantom lines illustrate the shape of the bosses before they ultrasonically upset to cause the material of the bosses to melt and flow together and thereby form a portion that bridges or connects the two bosses. The two bosses have been designated as 70 and 72 and it can be seen that they are generally V-shaped and that they project from wall 34 of fan 24. The bosses are located at opposite sides of one end of a groove 73 formed in fan 24.

The twisted together wire portion 68 is moved into the space between bosses 70 and 72 with a portion of wire 65 engaging a surface of the wall 34 of fan 24 and with this portion of wire 65 being located in groove 73. The tips of bosses 70 and 72 are now ultrasonically upset, causing the material of the tips to melt and flow together thereby forming a bridge or connecting portion 74 that is connected to root portions 76 and 78 of the bosses. This is accomplished by engaging a tool with the tips of the bosses 70 and 72 and vibrating the tool at an ultrasonic frequency. This melts the material of the tips of the bosses and causes them to be ultrasonically melted and welded together and to form the bridge or connecting portion 74. A portion of the length of the twisted wire portion 68, as well as a portion of the length of wire 65, are totally enclosed by the plastic material of the fan 24. This locks the twisted wire portion 68 and wire 65 to fan 24, that is, they cannot move relative to fan 24.

The wire 46, that has one end connected to slip ring 42, has an opposite end that is connected to an end of a copper wire 80. The opposite end of wire 80 is connected to an end of field coil 20. The other end of field coil 20, as previously mentioned, is connected to conductor 65.

Wire 80 extends through hole 82 in fan 24 and through a groove 84 formed in the fan which is the same as previously described groove 73. The ends of wires 80 and 46 are twisted together to form a length of twisted together wire designated as 86. The twisted wire length 86, as well as a portion of wire 80, are locked in place by a bridging or connecting portion 88 that is connected to spaced root boss portions 90 and 92 on fan 24. The bridging portion 88 is made in the same way as has been described in connection with the formation of bridging portion 74. Further, the ends of wires 80 and 46 are twisted together, welded and moved from a 65 degree position in the same manner that has been described in connection with the connecting of the ends of wires 48 and 65. Wire 46 has a length of outer insulation 46A that serves to insulate wire 46 from a portion of shaft 10 that has the slot 57. A part of wire 46 extends through slot 30 formed in hub 26 of fan 24.

Figure 2:
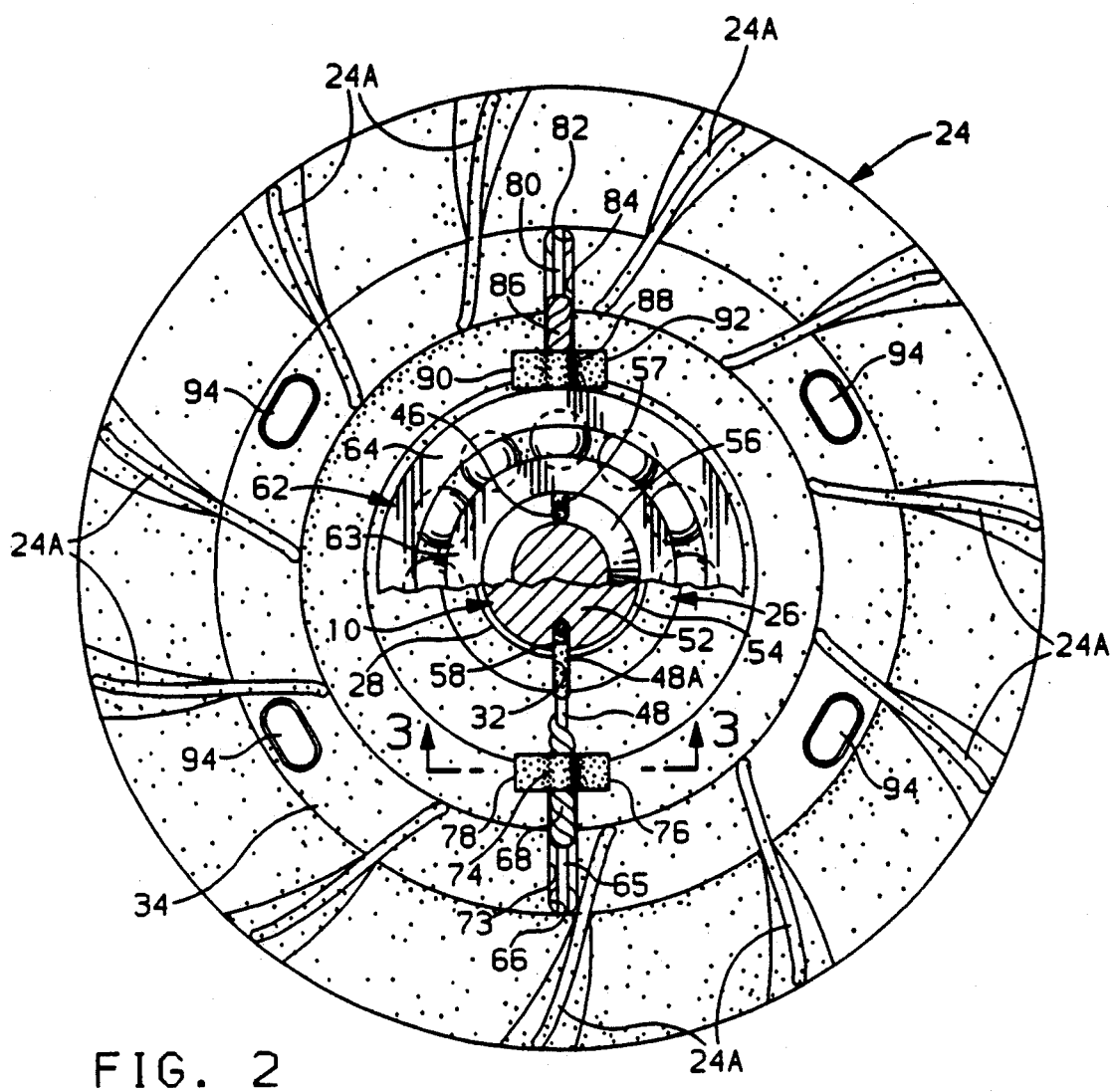
FIG. 2 is a view partly in section taken along line 2—2 of FIG. 1.

The spool 18 has four axially extending integral posts, the ends of which fit into openings formed in fan 24. These posts have not been illustrated in FIG. 1, however, the ends of these posts are shown in FIG. 2 where they are each designated as 94. The end portions of these posts extend through openings formed in fan 24 and are ultrasonically welded to fan 24. This type of mechanical connection between a field coil spool and a fan is known to those skilled in the art and is shown in the above-referenced patent to Gold, U.S. Pat. No. 4,588,911.

At the expense of some reiteration, it is pointed out that the twisted wire portions, like 68, are oriented such that the longitudinal axis of a twisted wire portion is normal to the longitudinal axis of shaft 10. Therefore, the centrifugal force acting on a twisted wire portion is in line with the longitudinal axis of the twisted wire portion. Further, the twisted wire portions are locked from movement relative to fan 24 by totally enclosing a part of the length of a twisted wire portion by material of the fan, as shown in FIG. 3.

By supporting the rotor shaft from a bearing that is located between the slip ring assembly and the fan, the slip ring assembly can have a smaller diameter because the shaft portion 50 can be made smaller since it is not a load bearing part. A smaller diameter slip ring assembly increases brush life.

The fan 24 provides an air impelling function and a wire locking and support function. If it were desired to use only the wire locking and support function of this invention the fan could be replaced by a part that is formed of a thermoplastic electrical insulating material that would have the wire locking and support functions that have been described. Such a part would not have fan blades.

The embodiments of the invention in which an exclusive property or privilege is claimed are defined as follows:

1. A rotor for an alternating current generator comprising, a shaft, a pair of pole segments carried by said shaft formed of magnetic material having a plurality of interleaved pole teeth, a core member formed of magnetic material disposed between said pole segments, a field coil disposed about said core member, a part formed of electrical insulating material located adjacent one of said pole segments, a slip ring assembly carried by said shaft comprising, first and second metallic slip rings, conductor means electrically connecting said first slip ring to a first end of said field coil, a first wire connected to said second slip ring, a second wire connected to a second end of said field coil, said first and second wires being twisted together to electrically connect said first and second wires and to provide a twisted together wire portion of a predetermined length, and means for locking said twisted together wire portion from movement relative to said part formed of electrical insulating material, said last named means comprising material of said part formed of electrical insulating material that completely encircles said twisted together wire portion at least over a portion of the length of said predetermined length of twisted together wire portion.

2. The rotor according to claim 1 where said twisted together wire portion has a longitudinal axis and where said shaft has a longitudinal axis and where said longitudinal axis of said twisted together portion is substantially normal to the said longitudinal axis of said shaft.

3. The rotor according to claim 1 where said part formed of electrical insulating material is a fan.

4. The rotor according to claim 1 where said material of said part formed of electrical insulating material that completely encircles said twisted wire portion is comprised of two boss portions disposed at opposite sides of said twisted together wire portion, said boss portions being bridged by a portion that is formed by melting portions of said boss portions together.

5. The rotor according to claim 1 where said first and second wires that are twisted together to provide said twisted together wire portion are welded together.

* * * * *